June 8, 1965

H. E. G. ARNESON 3,187,470

CENTER HOLE LAPPING APPARATUS

Filed Nov. 28, 1962

INVENTOR.
HAROLD E. G. ARNESON
BY
Reif and Gregory
ATTORNEYS

June 8, 1965 H. E. G. ARNESON 3,187,470
CENTER HOLE LAPPING APPARATUS
Filed Nov. 28, 1962 3 Sheets-Sheet 2
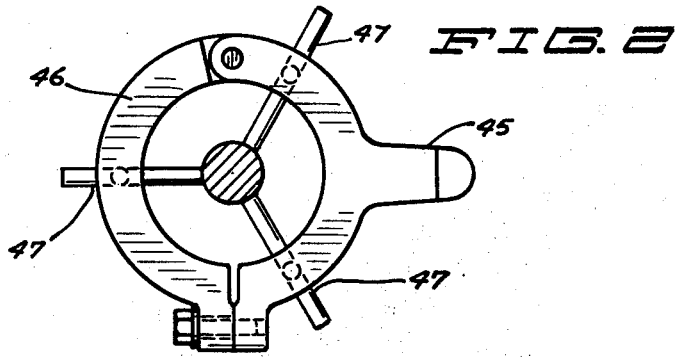
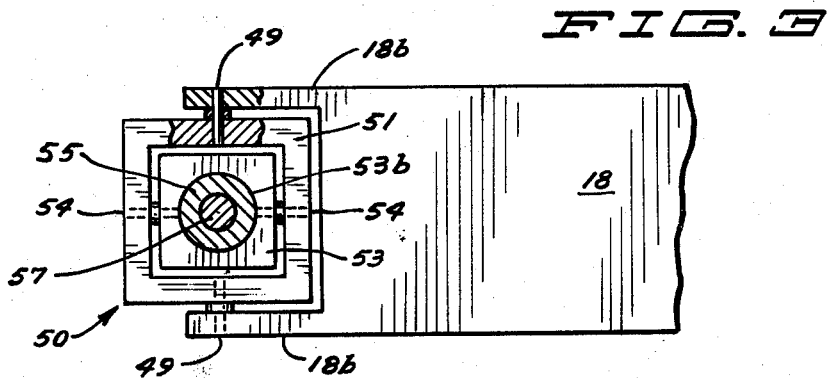
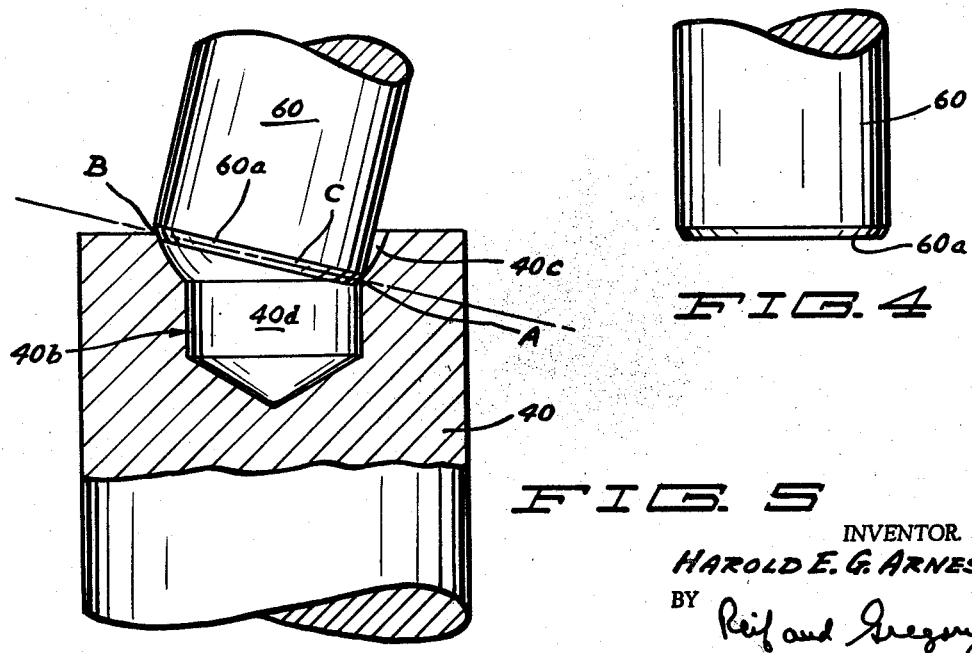
INVENTOR.
HAROLD E. G. ARNESON
BY
ATTORNEYS

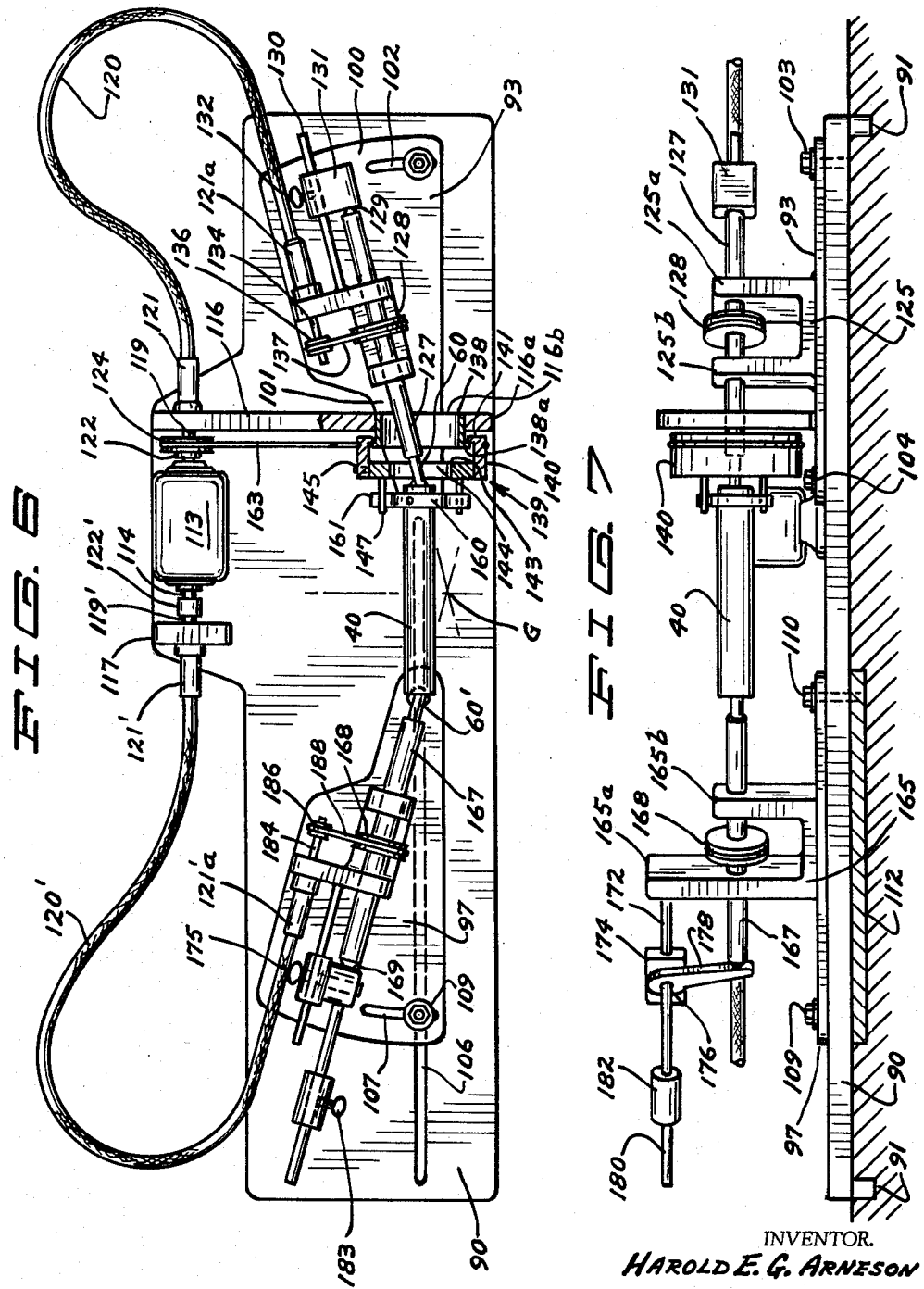

United States Patent Office 3,187,470
Patented June 8, 1965

3,187,470
CENTER HOLE LAPPING APPARATUS
Harold E. G. Arneson, % Professional Instruments Co., 6824 W. Lake St., Minneapolis 26, Minn.
Filed Nov. 28, 1962, Ser. No. 240,596
8 Claims. (Cl. 51—89)

This invention relates to an improvement in a center hole grinding apparatus, and more specifically relates to a center hole lapping apparatus in connection with centers for work pieces such as are supported between their centers, as in the case of external cylindrical grinding of work pieces.

Conical centers are commonly formed for work pieces and the conventional type of a center grinding machine uses a conical grinding cone which is plunged directly into the rough center hole to make full contact with the surface thereof to finish the same. The grinding cone with use loses its shape and produces inaccurate center holes. Some designs of apparatus disposed a grinding cone into a center hole making only a line contact therewith in moving about the inner surface of the center hole.

In either method of grinding, the roundness or accuracy of the center hole depends upon the accuracy of the spindles of the apparatus, the axial alignment of the spindle and the work piece. Unless the axes of the spindles and work piece coincide, the work piece will wobble. Further unless the condition of the grinding cone is perfect, the center hole will suffer from inaccuracy.

It is desirable therefore and an object of this invention to produce improved center holes for a work piece with said center holes providing a more dependable axis of rotation for said work piece.

It is another object of this invention to provide an apparatus for preparing work piece center holes wherein it is not necessary to have the axes of the spindles of a machine tool coincide with the axis of the work piece to provide a dependable axis of rotation for the work piece.

It is a further object of this invention to provide a lapping apparatus for producing accurate work piece center holes whereby the lapping members may be variously angled in grinding or polishing said center holes.

It is another object of this invention to provide a center hole machining apparatus which does not require an accurate preformed center hole for finishing, but which generates accuracy in its process of finishing the center hole.

It is also an object of this invention to provide an apparatus for generating a spherical work piece center hole.

These and other objects and advantages of the invention will be fully set forth in the following description made in connection with the accompanying drawings in which like reference characters refer to similar parts throughout the several views and in which:

FIG. 2 is a fragmentary bottom plan view of a portion of applicant's device taken on line 2—2 of FIG. 1, as indicated by the arrows;

FIG. 3 is a fragmentary view in horizontal section taken on line 3—3 of FIG. 1, as indicated by the arrows;

FIG. 4 is a fragmentary view on an enlarged scale of an end portion of a lapping tool showing the lapping head thereof;

FIG. 5 is a view on an enlarged scale of a fragment of a work piece in vertical section showing a broken portion representing a lap head in operating position within the center hole of said work piece;

FIG. 6 is a top plan view of a modification of applicant's device; and

FIG. 7 is a view in front elevation of applicant's modified device.

Figure 1:
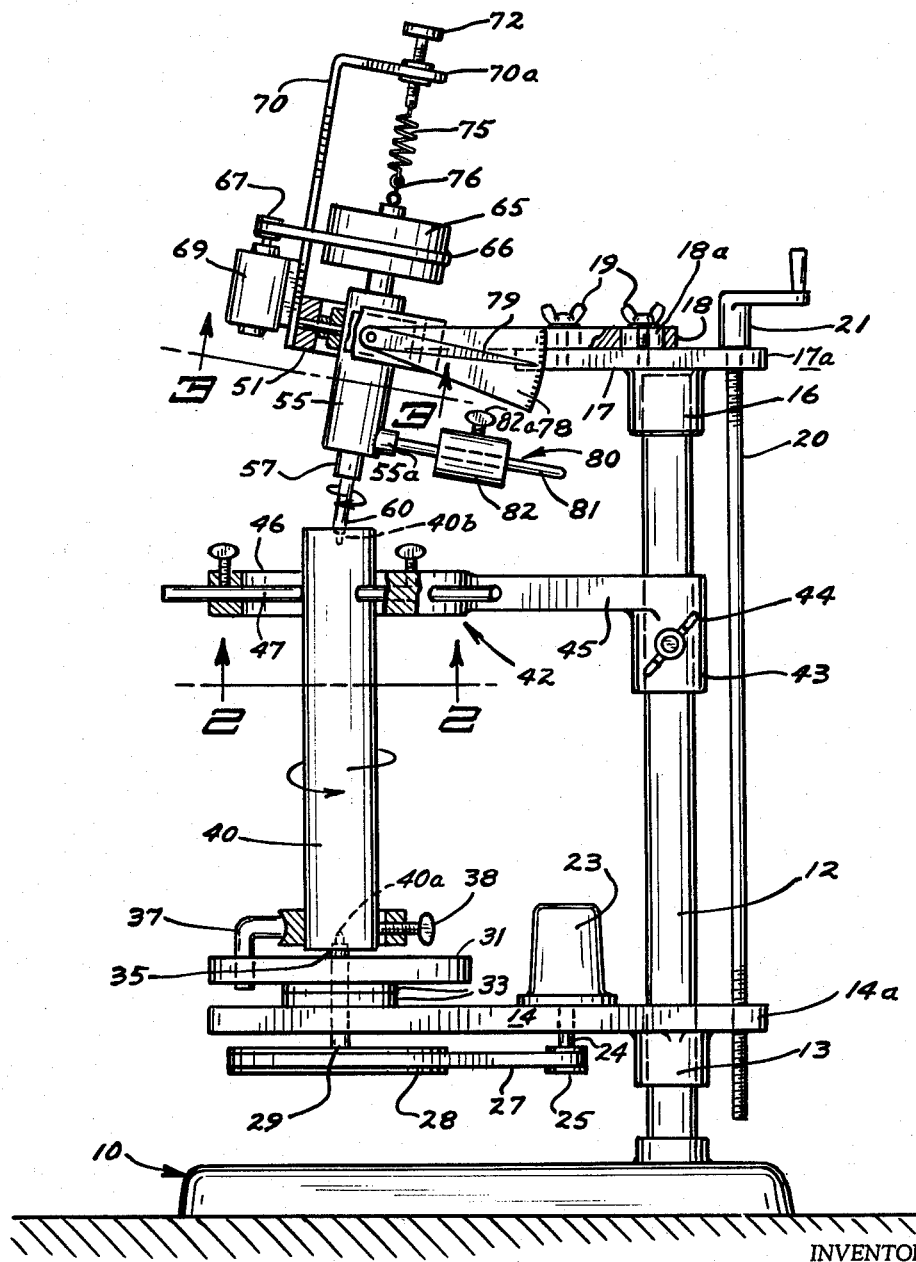
FIG. 1 is a view of applicant's device in side elevation with some portions shown in section and with portions thereof being broken away.

Referring to the drawings, one embodiment of the applicant's invention in the form of a single ended lapping device is shown in FIGS. 1–3 comprising a base 10 having upstanding therefrom a column 12 indicated here as being rectangular in cross section. Slidably mounted on said column 12 by a hub bearing 13 is a horizontal forwardly extending table 14. Mounted at the upper end portion of said column 12 by means of a hub cap 16 is a horizontally disposed arm 17 vertically aligned with said table 14. Said arm 17 has a partially overlying extendable arm portion 18 having spaced slots 18a therein for longitudinal adjustment of said portion 18 and thumb screws 19 secure the same to said arm 17. As indicated in FIG. 3, the free end portion of said arm portion 18 is bifurcated having spaced jaws 18b.

A vertical lead or adjusting screw 20 is journaled through a rearwardly extended ledge portion 17a of said arm 17 and suitably keyed therein with the depending portion thereof being threaded substantially the full height thereof and threaded through a rearwardly extending ledge portion 14a of said table 14. A crank 21 is secured to the upper end portion of said adjusting screw and said crank suitably rides on the upper surface of said ledge portion 17a.

Mounted on said table 14 adjacent the hub portion thereof is a motor 23 which will be suitably energized and depending therefrom below the level of said table is a drive shaft 24 carrying a pulley 25 and having a belt 27 pass thereover and over a substantially larger pulley 28 carried by a shaft 29 extending upwardly of said table 14 spaced inwardly of the free end thereof. Secured to the upper end of said shaft 29 is a turn table 31 spaced from said table 14 by bearing plates 33. Upstanding centrally of said table 31 is a live spherical center 35. Carried on said table is a right-angled swinging C clamp 37 equipped with a set screw 38 for securing the lower portion of a vertically disposed work piece 40 shown here as a cylindrical member having a lower center hole 40a seated on the center 35 and having an upper center hole 40b, and with reference to FIG. 5, the spherical portion 40c thereof is shown on an enlarged scale and a relief portion 40d is indicated.

Mounted for vertical travel on said column 12 is a steady rest 42 of conventional design comprising a hub portion 43 slidable on said column having a clamping or set screw 44, a horizontal arm portion 45 and a head portion 46 having angularly spaced jaws 47.

Referring to FIG. 3 and the arm portion 18, pivoted between said spaced jaws 18b by pins 49 is the outer ring 51 of a gimbal 50. An inner ring 53 is pivoted on pins 54 to pivot on a diameter at right angles to that of said outer ring. Said inner ring has an aperture 53b through which is disposed an elongated sleeve 55 and is secured therein by said pins 54. Journaled in said sleeve and extending therethrough is a spindle 57 having pressed therein a center lapping member 60 having its lapping head 60a in the form of a spherical zone or lap land as indicated in FIG. 4. At the upper end of said spindle 57 is mounted a pulley 65 driven by a belt 66 passing over said pulley and pulley 67 carried on the drive shaft of a motor 69 secured to an upwardly extending right-angled plate member 70 with said plate member forming a bracket and being suitably secured to the extended end portion of the gimbal ring 51. The angled upper portion 70a of said bracket 70 has a vertical adjusting screw 72 threaded therethrough having depending therefrom a compensating coil spring 75 having its lower end engaged by a hook 76 in turn secured to the upper free end portion of the spindle 57.

Secured to the outer side of one of said jaws 18b is a calibrated plate 78 forming a scale having a pointer 79 integral at one end with the pin 49 to be tiltable therewith to indicate the angle of inclination of the gimbal ring 51 and of the axis of the spindle 57.

Extending outwardly of a hub portion 55a of said sleeve 55 is a counter balancing member 80 comprising a calibrated rod 81 and a movable weight 82 thereon having a set screw 82a.

Operation

In connection with a conical center hole of a work piece, it is a common practice to use a conical grinding cone for forming and finishing the center hole. The grinding cone commonly has full contact with the surface of the center hole, and it is subject to intensive wear and it rapidly loses its shape through use, with the result that it is not uncommon to form imperfect holes. It is essential that the conical center holes be accurately formed in the first instance, as their accuracy is not improved by the finishing process. It is essential that center holes be perfectly accurate to be in full contact in operating position with the tapered surfaces of the grinding machine centers.

The above conditions are avoided in the use of applicant's apparatus in forming spherical center holes. A lapping tool is used in connection with the applicants apparatus. Here instead of full surface contact there is point contact with random movement between the lapping member and the lapped surface. Hence in generating a spherical surface within a center hole, the mutual wear of the lapping tool and of the work piece tends to develop perfect sphericity of both the center hole and of the lapping tool. It is sufficient for the spherical area within the center hole to be in the form of a spherical zone and the spherical grinding machine centers will hold the work piece in operating position merely by engagement with the spherical zones of the center holes of the work piece.

In connection with conical center holes there must be exact alignment of grinding machine centers and a coincidence of the machine centers and the axis of the work piece. Hence the axes of the center holes must also coincide with the axis of the work piece. On the other hand in connection with spherical center holes, the axes of the machine centers and the axis of the work piece tend to be self-aligning.

Referring first to FIG. 5, the land 60a of the lapping tool or member 60 is shown here in the form of a spherical zone. The spherical area 40c generated in the work piece center hole 40b is in the form of a spherical zone. The diameter of the lapping land 60a of the lapping member 60 preferably will be such that the upper and lower peripheral portions indicated at points A and B of the spherical zone 40c will be overlapped by approximately one-half of the depth or thickness of the lapping land or spherical zone 60a. In other words, the hypothetical median line C as shown lies in a cross sectional plane passing through the lapping land 60a and intersecting points A and B. The distance between the points A and B will determine the diameter of said median line C of said spherical zone of the lapping member and this will determine the effective diameter of the lapping member. The computations for this are readily worked out and will be apparent to one skilled in the art. The axis of the spherical zone 40c is identical with the axis of the work piece.

The axis of the lapping member 60 in bisecting the line A–B at right angles thereto, as indicated in FIG. 5, will determine the angular position of the lapping member 60 relative to the spherical zone 40c to be generated.

Thus it is seen that the effective diameter of the lapping land of the lapping tool may readily be predetermined relative to a specific center hole and its angular position relative to the axis of said center hole may also be predetermined.

Now with reference to FIG. 1, the arm portion 18 will be adjusted longitudinally of the arm 17 to position the spindle 57 in its desired angular relationship to said center hole 40b as predetermined in connection with positioning said lapping member as above described. When the center hole 40b has been lapped, the work piece will be reversed endwise and the center hole 40a will be lapped in a like manner.

The weight 82 will be adjusted to counter-balance principally the weight of the motor 69 and the bracket 70 in connection therewith. The spring 75 will be adjusted to offset the axial thrust of the spindle 57. The use of the steady rest 42 is conventional and the function of the adjusting rod 20 is believed to be quite obvious.

As here illustrated, the supporting table 31 and the member 37 clamping the work piece 40 will be rotated in one direction as indicated, and the lapping member 60 will be oppositely rotated.

It is noted that the lapping member 60 is mounted for universal pivotal movement in connection with the gimbal 50 and the axial thrust that would otherwise be present is substantially offset by the spring 75 whereby the lapping head is in condition to have free random movement in generating a spherical zone in the center holes of the work piece.

Modification

With reference to FIG. 6, a modification of applicant's invention is shown in the form of a double headed lapping device. Applicant's modified device comprises a raised bed plate 90 having supporting members 91. Carried on said bed plate is a base plate 93 of one lapping head and in spaced relation thereto is a second base plate 97 of a second lapping head.

Said base plate 93 is shown to be somewhat triangular in plan having a rear portion 100 and a tapered front end portion 101. Adjacent the edge of said rear portion is a transverse arcuate slot 102 with a suitable clamping bolt 103 disposed therethrough and threaded into said bed plate 90. Adjacent the front end of said base plate disposed therethrough and secured in said bed plate is a shoulder bolt 104 forming a pivot for said base plate 93 for lateral pivotal adjustment thereof.

In alignment with said bolts 103 and 104 is a longitudinally extending slot 106 in said bed plate. Said base plate 97 has a transverse arcuate slot 107 adjacent the rear edge portion thereof through which is disposed a suitable bolt 109. Through the tapered portion of said base plate 97 is a pivot bolt 110. Said bolts 109 and 110 extend through said slot 106 and are secured to an underlying sliding plate 112.

Carried on said bed plate 90 centrally at one side thereof is a motor 113 which will be suitably energized. Said motor has a drive shaft 114 extending outwardly at either end thereof longitudinally of said bed plate.

Upstanding adjacent either end of said motor are transversely extending frame members 116 and 117 functioning as bearings. Said bearing 116 extends substantially the full width of said bed plate 90 having the end portion 116a thereof remote from said motor offset upwardly to clear said base plate 93. Said bearing 117 is of short extent. Extending through the bearing 116 is the shaft 119 of a flexible cable or driving member 120 with the coupling 121 of said cable being suitably secured to said bearing, and said shaft 119 is connected to one end of the drive shaft 114 by a conventional coupling 122. Here shown integral with said coupling and disposed thereabout is a V pulley 124.

Identical with said drive member 120 is the flexible drive member 120' having a coupling 121' connected to the bearing 117 and the shaft 119' of said driving member extending through said bearing to be coupled to the adjacent end of the drive shaft 114 by a conventional coupling 122'.

Upstanding from said base plate 93 is a U-shaped frame member 125 having spaced apertured walls 125a and 125b, forming a bearing for a spindle 127 journaled therethrough and disposed about said spindle between said walls is a pulley 128. Said spindle is movable longitudinally relative to said walls to the extent permitted by said pulley. Imbedded in the rear end of said spindle is a ball bearing 129. Said wall 125a as indicated in FIG. 6 has a greater width than the wall 125b. Extending rearwardly of said wall 125a and parallel to said spindle 127 is a rod 130 on which is carried a sliding block 131 forming a weight adapted to be secured to said rod by a set screw 132. Said block is indicated as being substantially rectangular in cross section and forms a stop member for said spindle 127 having said ball 129 bearing thereagainst.

Journaled in said wall 125a spaced outwardly of said rod 130 is shaft 134 carrying a pulley 136 on its forwardly extending portion. Secured to the rearwardly extending portion of said shaft in a conventional manner is the coupling 121a of the flexible shaft 120. A belt 137 passes over said pulleys 136 and 128.

The portion 116a of the frame member 116 is raised to clear the base plate 93 to permit pivotal adjustment thereof. Said portion 116a has a circular aperture 116b therethrough and pressed into said aperture is a bearing collar 138 having a forwardly extending outwardly flanged rim portion 138a forming a bearing surface onto which is mounted one end portion of a cylindrical pulley 140 having an inwardly extending flange 141 interlocking with said flange 138a. Extending forwardly of said pulley 140 and integral therewith is a driving member 139 comprising a plate 143 disposed within the forward end portion of said pulley and secured thereon by screws 145 and having a central aperture 144 therein. Extending forwardly of said plate 143 and integral therewith is a pair of diametrically opposed pins 147. Said spindle 127 as here shown extends forwardly through said collar 138. Pressed into the free end of said spindle is a spherical lap member identical to said lap member 60 above described and bearing the same character.

In connection with the embodiment herein described is a cylindrical work piece 40 identical with that previously described and bearing the same characters. Secured in a conventional manner about the end portion of said work piece adjacent said driver 139 is a collar 160 having diametrically opposed arms 161 to be engaged by said pins 147. A belt 163 passes over said pulleys 124 and 140.

With reference to said base plate 97, upstanding therefrom is a U-shaped frame member 165 similar to said frame member 125 having apertured side walls 165a and 165b forming a bearing for a spindle 167 journaled therein and extending therethrough and having a pulley 168 identical to said pulley 128 mounted thereabout between said walls 165a and 165b. The spindle 167 is identical to said spindle 127 having a ball bearing 169 pressed into its rear end portion. Pressed into the forward end of said spindle 167 is a lap member 60' identical to said lap member 60 and having a similar lap land portion.

Said wall 165a has a somewhat greater height than said wall 165b. Extending rearwardly of said wall 165a at a somewhat greater height than said spindle 167 is a rod 172 which will form a scale and having a slidable weight 174 thereon secured by a set screw 175. Journaled outwardly of said weight 174 parallel to said wall 165a is a freely rotatable pin 176 carrying a weight 178 secured to the extended end thereof and shown tapered in form extending downwardly sufficiently to engage and bear against the rear end portion of said spindle 167. Integral with said weight 178 and extending rearwardly thereof is a rod 180 having a slidable weight 182 thereon carrying a set screw 183. Said weights 178 and 182 provide variable axial thrust for the spindle 167.

Journaled through said wall 165a in substantially horizontal alignment with said spindle 167 is a shaft 184 carrying a pulley 186 in alignment with said pulley 168 with a belt 188 passing over said pulleys. Said shaft 120' is connected to the rearwardly extending portion of said shaft by a conventional coupling 121'a.

*Operation*

The spindles 127 and 167 are movable axially to a limited extent in their respective bearing members 125 and 165 with their movement being limited by their respective pulleys 128 and 168 together with their respective belts 137 and 188. The axes of said spindles are disposed in a common horizontal plane. The member 131 forms a stop member at the outer end portion of the spindle 127. The pivotal weight member 178 bears against the outer end portion of the spindle 167. Carried between the opposed lapping members 60 and 60' is a work piece 40 having center holes at either end thereof into which are disposed the free ends of said lapping members. The weight 178 will be sufficient in bearing against the spindle 167 to retain the work piece in operating position between the lap members 60' and 60.

The bases 93 and 97 respectively are pivotally adjustable as indicated. The base 97 is movable in the slot 106 longitudinally of the bed plate 90 in a direction towards and away from the base 93.

The motor 113 in connection with the flexible driving members 120 and 120' through their respective pulleys and belts will rotate the spindles 127 and 167 in one direction as indicated. The belt 163 passing over the pulleys 122 and 140 and driven by said motor 113 will rotate the work piece in a direction oppositely that of said spindles. More specifically, the work piece is rotated by the driving member 139 with the free engagement of its pins 147 with the collar 160. The bearing collar 138 and the apertured pulley 140 permit the lateral adjustment of the spindle 127 and the lap 60 extending therethrough.

With reference to the above description and to FIG. 5, the reference diameter of the medium point of the lap land 60a will be determined as previously described relative to the size of the center hole desired. The angular relationship of the spindles 127 and 167 relative to the center holes of the work piece 40 will be determined as described in connection with the embodiment in FIG. 1.

In generating the spherical zones in the center holes, the center holes may be roughly preformed as cones. There is not an exact alignment of machine centers necessary in preforming the conical holes for the purpose of lapping spherical zones therein as in the case where the preformed conical center holes are finished in conical condition. Where the preformed conical center holes have spherical zones lapped therein, the sphericity of both the center holes and of the lapping member improves during the process of lapping and thus the accuracy of the center hole is subject to improvement. In finishing a conical center hole, the conical grinding tool becomes less perfect as the finishing continues and the center hole is never more accurate than its starting condition.

In connection with spherical center holes, the axes of the machine centers holding a work piece having such center holes, tend to be self-aligning and to hold the work piece in position to have a dependable axis of rotation. In using conical center holes, unless the machine centers are aligned, and the center holes accurately formed, there will not be a full surface contact between the center holes and their respective machine centers. As a consequence thereof, the work piece will have a tendency to wobble and will not have a dependable axis of rotation. Extreme accuracy in finishing a work piece is more readily attainable with the use of spherical center holes in the work piece than in the use of conical center holes. Full surface contact is not necessary with spherical centers. A line contact is sufficient.

The reference line A–B in FIG. 5 indicates the depth of the desired sphericity zone. If the axis of the lap member 60 does not exactly bisect said reference line at right angles, the spherical zone may have a lesser or greater depth, but this will not affect the accuracy with which the work piece will be seated between spherical machine centers.

With reference to FIG. 6, the point G represents the point of intersection of the extensions of the axes of the respective lapping members when said axes bisect the reference line A–B at right angles thereto. This is not a necessary condition. Accurate spherical center holes can be generated with any angular relation between the opposing lap members at which the work piece can be operatively retained therebetween, and a dependable axis of rotation will result in positioning the work piece between spherical machine centers as for the surface grinding of the work piece.

Thus it is seen that a substantial improvement is present in the use of applicant's apparatus in generating spherical center holes in work pieces.

It will of course be understood that various changes may be made in the form, details, arrangement and proportions of the apparatus and in the steps and sequence of steps of the method without departing from the scope of applicant's invention, which, generally stated, consists in an apparatus capable of carrying out the objects above set forth, such as disclosed and defined in the appended claims.

What is claimed is:

1. A spherical center hole lapping apparatus for generating a spherical zone in a work piece center hole having in combination,
   a supporting structure,
   a spindle,
   a lap member for generating a spherical zone carried by said spindle,
   means on said supporting structure arranged and constructed to yieldingly support said spindle freely swingably to position the axis of said spindle at an angle to the axis of a work piece,
   means in connection with said apparatus rotating said spindle,
   means carried by said supporting structure rotating said work piece,
   supporting means directionally opposed to said spindle having said work piece therebetween.

2. A spherical center hole lapping apparatus for generating a spherical zone a work piece center hole having in combination,
   a workpiece supporting structure, means in connection with said supporting structure rotating said work piece,
   a spindle, means in connection with said supporting structure universally pivotally supporting said spindle, means in connection with said last mentioned means rotating said spindle,
   a lap member for generating a spherical zone carried by said spindle,
   means in connection with said second mentioned means and said spindle angling said lap member to position the axis thereof a a certain predetermined angle relative to a reference line extending diagonally across the spherical zone to be generated, and
   said lap member having a lap land comprising a spherical zone having a diameter through the cross sectional plane of its spherical zone at a median point of depth of its spherical zone equal in length to the length of said reference line.

3. The structure set forth in claim 2,
   said third mentioned means comprising a calibrated plate member carried by an arm supporting said spindle, and a pointer in connection with said plate member, and
   said pointer being integral with said spindle to be tiltable therewith.

4. A spherical center hole lapping apparatus for generating a spherical zone in a work piece center hole having in combination, a column,
   a table vertically slidable on said column, means in connection with said column raising and lowering said table,
   means in connection with said table rotatably supporting said work piece,
   means carried by said column comprising a steady rest for said work piece,
   a horizontally disposed extendible arm carried on said column spaced vertically of said table and being aligned therewith,
   a spindle, a universally pivotal means carried by said arm and carrying said spindle,
   a lap member carried by said spindle to generate a spherical zone
   means carried by said pivotal means rotating said spindle, and
   means controlling the axial thrust of said lap member carried by said pivotal means.

5. The structure set forth in claim 4, and
   means carried by said extendible arm to determine the degree of extension of said arm to tilt said spindle at a predetermined angle with relation to said spherical zone to be generated.

6. A spherical center hole lapping apparatus in connection with a cylindrical work piece having spaced center holes therein having in combination,
   a supporting structure,
   opposed first and second pivotal plate members on said supporting structure, said plate members being pivoted at their adjacent end portions,
   a slot in said supporting structure relative to said second plate member, said second plate member being movable toward and away from said first plate member,
   means supporting a spindle on said first plate member, a spindle carried on said second plate member in a directionally opposed relation to said first spindle,
   said spindles respectively carrying lap members at their adjacent ends,
   means in connection with said supporting means rotating said spindles,
   said work piece being retained between said lap members, said lap member being coplanar horizontally and having their respective axes at an angular relation to one another,
   said second plate member carrying yielding means applying axial thrust to said second spindle to retain said work piece between said adjacent lap members,
   an upstanding frame member extending over the pivoted end portion of said first plate member,
   a cylindrical collar disposed through said wall, said spindle on said first plate member extending through said collar and being pivotal therein,
   a drum bearing rotatably carried on said collar, spaced fingers extending outwardly of said drum bearing in the direction of said work piece, a collar carried on said work piece having radially extending arms engaged by said fingers, and
   said rotating means carried by said supporting structure rotating said drum bearing.

7. The structure set forth in claim 6,
   an upstanding frame member having said second spindle journaled therein,
   a rod extending rearwardly of said frame member, a member slidable on said rod,
   a depending member journaled in said last mentioned member to be freely swingable therefrom and engage the rear end portion of said second spindle, and
   a rod extending rearwardly of said last mentioned member carrying a slidable weight thereon to determine the degree of pressure of said last mentioned member against said rear end portion of said second spindle.

8. A spherical center hole lapping apparatus for generating a spherical zone in a work piece center hole having in combination,
an upstanding supporting member,
a table movable vertically of said supporting member,
means in connection with said supporting member moving said table,
means in connection with said table rotatively supporting a work piece thereon,
an arm carried by said supporting member overlying said table,
a spindle, a universally pivotal means carrying said spindle on said arm,
a lap member for generating a spherical zone carried by said spindle disposed in a center hole of said work piece,
means carried by said pivotal means rotating said spindle, and
means carried by said arm to position the axis of said lap member in a predetermined position to have a certain angular relationship to a certain reference line relative to said center hole of said work piece.

References Cited by the Examiner
UNITED STATES PATENTS

| | | | |
|---|---|---|---|
| 689,192 | 12/01 | Jones | 51—105 |
| 1,224,680 | 5/17 | Starin | 51—291 |
| 1,352,790 | 9/20 | Danielsson | 51—105 |
| 2,356,499 | 8/44 | Beduneau | 51—291 XR |
| 2,574,793 | 11/51 | Maracz | 51—290 |
| 2,599,025 | 6/52 | Stampen | 51—290 |

LESTER M. SWINGLE, *Primary Examiner.*